(12) United States Patent  (10) Patent No.: US 6,216,488 B1
Rucker  (45) Date of Patent: Apr. 17, 2001

(54) MULTI PURPOSE COOLER

(76) Inventor: Rick D. Rucker, 3121 Napoleon, Tampa, FL (US) 33611

( * ) Notice: Subject to any disclaimer, the term of this patent is extended or adjusted under 35 U.S.C. 154(b) by 0 days.

(21) Appl. No.: 09/243,393

(22) Filed: Feb. 1, 1999

(51) Int. Cl.[7] ................................................. F25D 3/08
(52) U.S. Cl. ............................................ 62/457.7; 62/331
(58) Field of Search ............................. 62/457.7, 457.2, 62/331

(56) References Cited

U.S. PATENT DOCUMENTS

| | | | |
|---|---|---|---|
| 4,577,475 | * 3/1986 | Herrera | 62/457.1 |
| 4,704,875 | * 11/1987 | Kieler | 62/372 |
| 4,873,841 | * 10/1989 | Bradshaw et al. | 62/239 |
| 4,974,426 | * 12/1990 | Gomez et al. | 62/457.7 |
| 5,249,438 | * 10/1993 | Rhaney et al. | 62/457.7 |
| 5,269,157 | * 12/1993 | Ciminelli et al. | 62/457.7 |
| 5,275,018 | * 1/1994 | Lin et al. | 62/457.7 |
| 5,313,817 | * 5/1994 | Meinders | 62/457.1 |
| 5,337,911 | * 8/1994 | Holub | 220/254 |
| 5,463,945 | * 11/1995 | Kendall | 108/59 |
| 5,660,296 | * 8/1997 | Greenwich | 220/326 |
| 5,781,853 | * 7/1998 | Johnson | 455/351 |
| 5,876,047 | * 3/1999 | Dennis | 280/47.35 |
| 5,979,175 | * 11/1999 | Ellison | 62/457.7 |

* cited by examiner

Primary Examiner—William Doerrler
Assistant Examiner—Melvin Jones
(74) Attorney, Agent, or Firm—Banner & Witcoff, Ltd.

(57) ABSTRACT

A thermally insulated cooler is provided which presents multiple storage compartments for hot or cold food and beverages, an umbrella holder, and allows for translation of the cooler over a surface. Additionally, the thermally insulated cooler and storage device may also be used as a dolly to transport larger beach wares such as folding chairs and play toys. A centrally located umbrella holder is also provided along with audio speakers and a stereo receiver that may be removed from the thermally insulated cooler. Accordingly, the thermally insulated cooler provides storage and transportation of beach, camping or similar gear.

4 Claims, 3 Drawing Sheets

MULTI PURPOSE COOLER

BACKGROUND—FIELD OF INVENTION

This invention relates to thermally insulated coolers, specifically to a new and improved cooler.

BACKGROUND—DESCRIPTION OF PRIOR ART

Although devices existed prior to the present invention that addressed themselves to cooler structure, it should be noted that none of the devices achieve the advantage of the present invention. Nor are they capable of achieving the overall versatility of the present invention. In conjunction with the with the above it should be noted that the prior coolers considered by, the applicant, but which are in no way capable of achieving the results of the present invention. They are as follows:

U.S. Pat. No. 5,259,215 to D. Rocca
U.S. Pat. No. 5,373,708 to J. Dumoulin Jr.
U.S. Pat. No. 4,667,484 to R. Tarozzi
U.S. Pat. No. 5,235,822 to G. Leonovich Jr.

Carrying food, beverages, sun chairs etc. is usually very tiring and annoying. Therefore I wanted to provide a cooler which is both lightweight and convenient that is capable of holding food, beverages, sunglasses, magazines and various other items.

SUMMARY OF THE INVENTION

The present invention is directed to an improved cooler. My invention allows all of your beach wear, for example, chairs, magazines, umbrella, to all be transported in one cooler. In view of the foregoing disadvantages inherent in present coolers, the new invention proposes many advantages. Among these are a platform, wheels, two recessed cavities for storage, pulling handle, umbrella stand and much more which we will discuss in further detail later.

BRIEF DESCRIPTION OF THE DRAWINGS

Referring now more particularly to the embodiment of the above invention as illustrated in the accompanying drawings. With reference to the drawings, FIG. 1 shows a 3 dimensional perspective view of the said invention. You can see the side compartment 7 and the drawer under the cooler which both depict recessed cavities in which you can put magazines, sunglasses etc.. As you can see in 8, 9, 10, the said invention also has a stereo amplifier or am/fm radio. The pull out handle 5 is easily pulled down as in FIG. 4. FIG. 1 also gives a good view of the lid which we will discuss later in greater detail when we get to FIG. 5. 1 is a rectangular lid attached to said invention by way of hinges. 1a is an indentation on 1 which will allow objects to be placed on it without falling off As illustrated the cooler comprises lids, 1 and 2 wall structure 3 and undercarriage 4. In keeping with the above, wall structure 3 and undercarriage 4 are formed and otherwise comprised of a singular unitary construction in a manner and fashion well known wherein lid 1 and 2 fits upon the opening formed by wall structure 3 so as to provide a structural interfit capable of achieving a thermal seal between wall structure 3. The handle 5, is easily pulled down to pulling position as shown in FIG. 1. FIG. 4 shows how the handle can be pulled down making the invention transportable and also showing how it can be transformed into a dolly type device when the platform 12 is pulled out as in FIG. 4. The platform 12 easily slides in and out. Another embodiment of the invention are the storage compartments, 6 and 7. Referring now in particular to 6. The idea was conceived to balance the height from the wheels to the ground providing another storage area. The drawer 6, slides in and out by way of a groove in each side of the opening. This drawer will be large enough to hold various items. Of course as in prior inventions, my new and improved invention can be made in various sizes. The storage compartment 6 is opened by means of a small indentation in front 6a. Now we refer to another compartment 7. A cavity was formed in the side of the cooler for receiving articles. A pivotally supported closure member is carried by the side of the cooler for closing it's cavity and retaining articles within it. My invention also provides for an audio system. The audio system comprises a receiver 10, which detaches easily from the recessed cavity in which it is housed. You can then insert batteries to power it. Another component of the audio system are the speakers, of which there are two 8a and 8b and a set of tweeters 9a and 9b. This combination of speakers for low range and the tweeters for high range combine to give the best possible sound. Now referring to 11 of FIG. 1, the wheels are attached by way of a metal rod (not shown). In accordance with the above invention these wheels make the invention completely portable. In keeping with the invention, platform 12, slides out from grooves in wall structure 3. This platform is recessed and when pulled out fully and the invention is used according to the proposed way you now have a dolly device for transporting various objects such as chairs and other such stuff. In conjunction with the invention and now referring to FIG. 2

Figure 1:
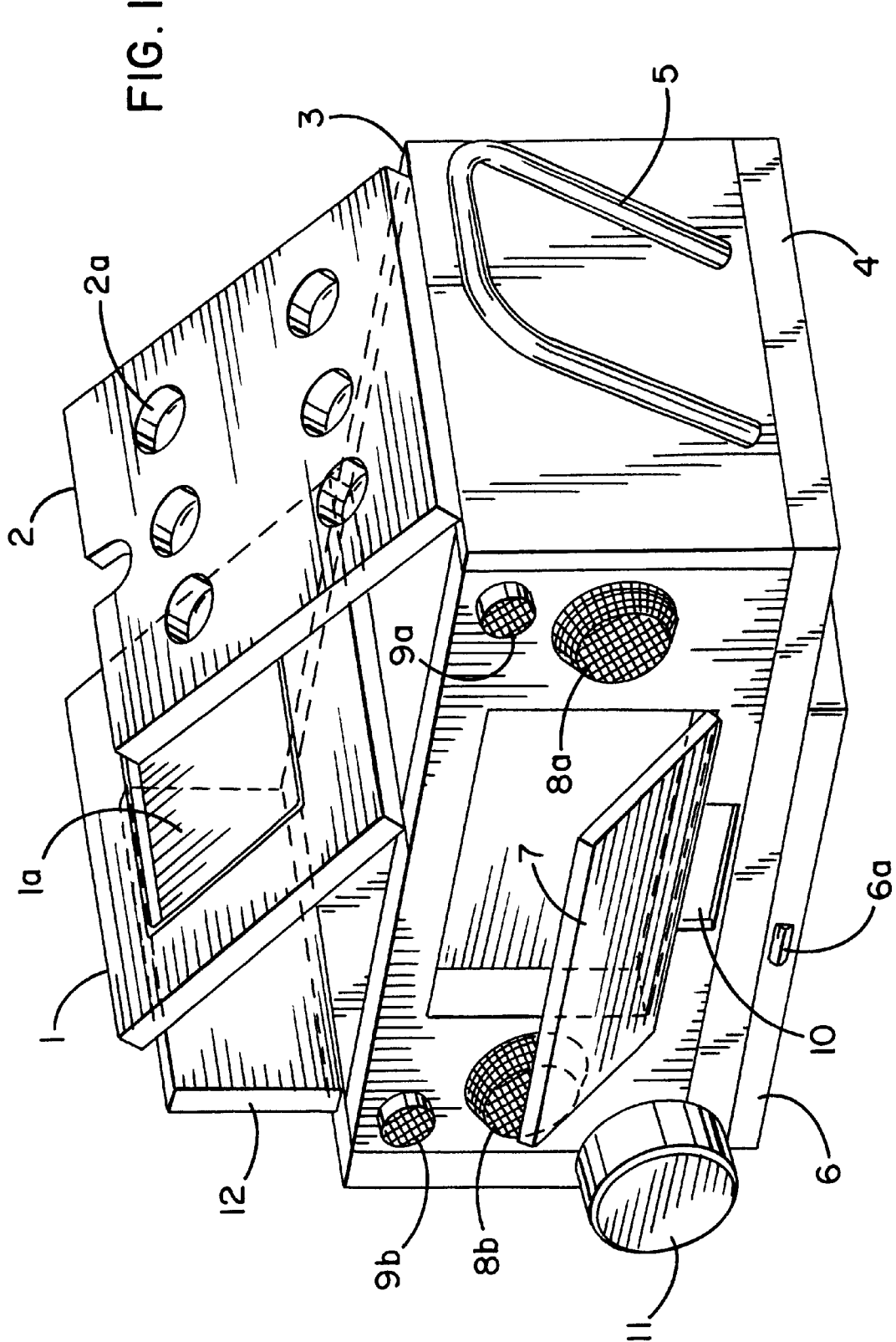
FIG. 1 is a three dimensional perspective view of a cooler constructed in accordance with the invention.
Figure 2:
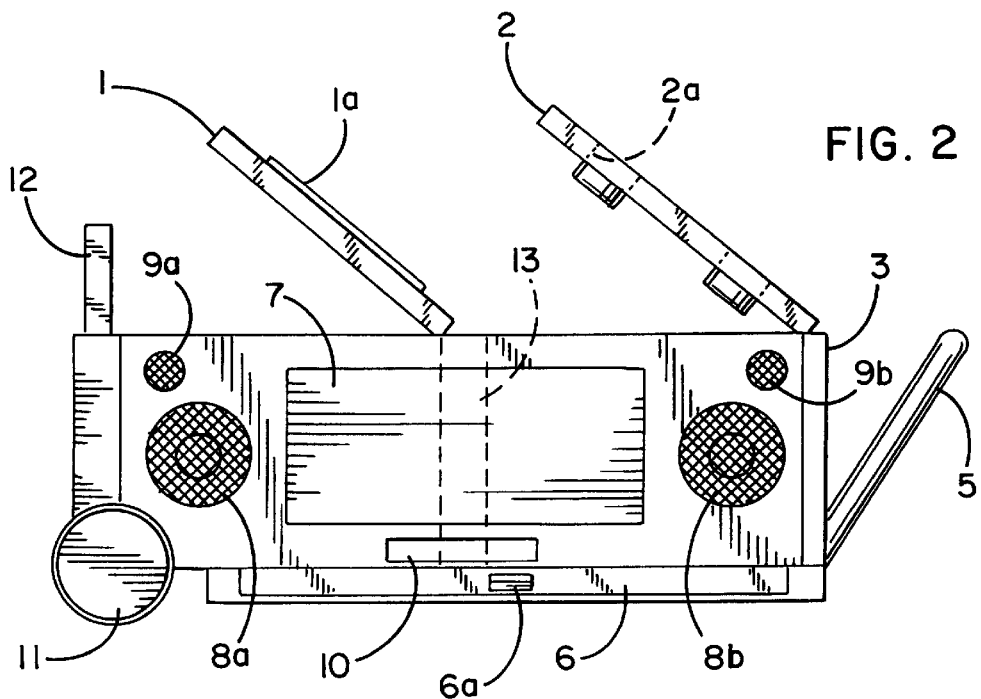
FIG. 2 is a side view of the invention.

There is depicted a side view as shown in FIG. 1. As further illustrated in FIG. 2 we refer now to lids 1 and 2. Referring more specifically to the lid 1, this opens from back to front so that when the above mentioned invention is in the upright pulling position the lid remains closed. If we look closer to 1a, an indentation in the lid you will see that the purpose of this is so that an object, when placed in it cannot slide off or be blown off easily. Another embodiment of the invention is lid 2 and drink holder 2a. Looking now more specifically at lid 2 notice a small U shape cut out.

Figure 5:
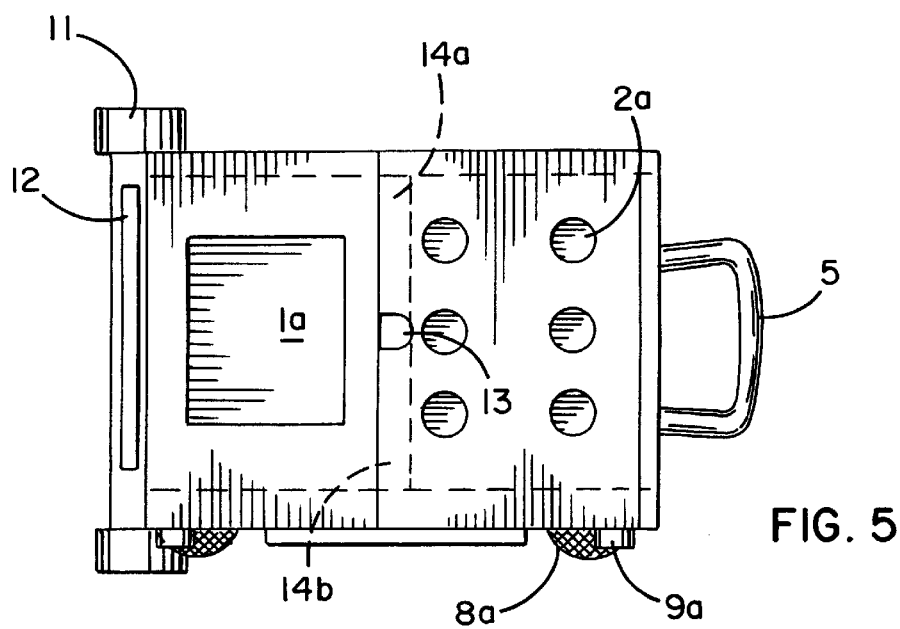
FIG. 5 is a top view showing drink holders and indentation in lids.

This is for the purpose of the umbrella holder 13 which can be seen clearly in FIG. 5. Also on this lid 2 can be seen various small round indentations 2a. These are drink holders and are capable of holding a typical 12 oz beverage can or an average size beverage bottle. There will be between 4–6 of these drink holders 2a on the lid. As you can see more clearly from FIG. 2 you can easily see the direction in which the lids open as discussed earlier in FIG. 1. The platform 12 can be seen here in a half pulled out position, depending on what you have to carry around you can vary how much you want to pull the platform 12 out.

Figure 3:
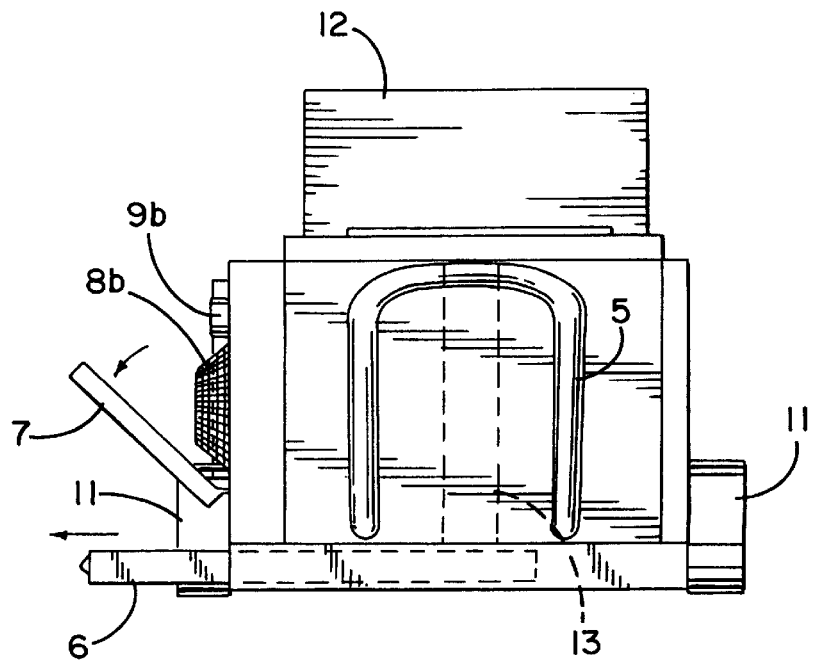
FIG. 3 is a front view of the invention, showing the handle.
Figure 4:
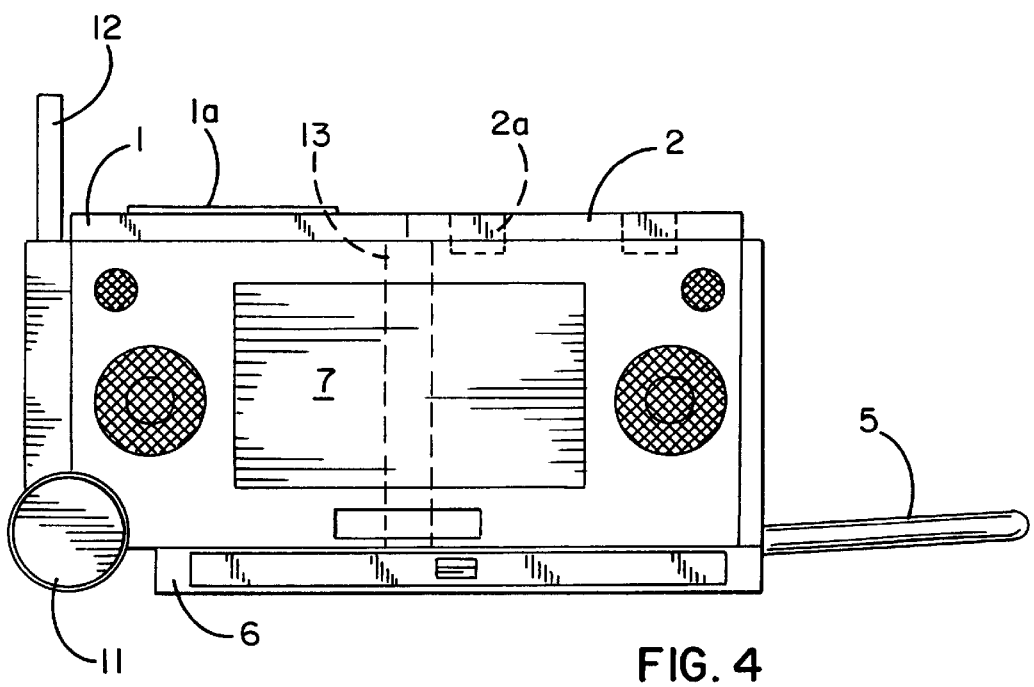
FIG. 4 is a side view also, which depicts how the platform and pull down handle can both be utilized to transform the cooler to a "dolly"

If we now look at the umbrella holder 13 as depicted in FIG. 3. It is centrally placed in our new and improved cooler. As depicted in the umbrella bolder 13 we utilized an otherwise useless space and an umbrella can be easily and quickly be placed in holder 13. Side compartment 7 is now in an open position as is drawer 6 both of which are in FIG. 3. Now referring to FIG. 5, clearly depicted here are 2 ice compartments 14a and 14b. These compartments can be used to place cold ice packs in or simply just put ice in to keep the inside of the cooler cool. In FIG. 4 the handle 5 can be seen to be pulled all the way down so that when my invention is in the upright position it can be pulled and is transportable. It will be understood that the foregoing general description and the following detailed description as well are exemplary and explanatory of the invention but are not restrictive thereof. The accompanying drawings referred to herein and constituting a part hereof are illustrative of the invention but not restrictive thereof and together with the description serve to explain the principles of the invention. With respect to the above description then it is to be realized that the optimum dimensional relationship for the parts of the invention, to include variations in size, materials, shape, form, function and manner of operation, assembly and use, are deemed readily apparent and obvious to one skilled in the art. It is not desired to limit the invention to the exact construction and operation shown and described, and accordingly, all suitable modifications and equivalents may be resorted to, falling within the scope of the invention.

REFERENCE NUMERALS IN DRAWINGS

1 Lid
1a Indentation in Lid
2 Lid
2a Drink Holder
3 Wall Structure
4 Undercarriage
5 Handle
6 Lower Compartment
6a Opening Indentation
7 Side Compartment
8a Right Speaker
8b Left Speaker
9a Right Tweeter
9b Left Tweeter
10 Receiver
11 Wheel
12 Platform
13 Umbrella Holder
14a Ice Compartment
14b Ice Compartment What is being claimed as being new and desired to be protected by Letters Patent of the United States is as follows:

1. A multi-purpose cooler having a plurality of insulated walls, bottom structure and lid adapted for receiving items therein insulated from external ambient temperatures comprising:

a pair of wheels rotatably mounted to the bottom structure;

a handle for gripping and pulling the multi-purpose cooler for translation of the cooler via the wheels over a surface;

a retractable holder; and a cylindrical cylinder transversing the multi-purpose cooler through the center with openings at the lid and bottom structure for receiving a cylindrical member.

2. The multi-purpose cooler of claim 1 wherein the cylindrical member is a support for an umbrella.

3. The multi-purpose cooler of claim 1 wherein the retractable holder is a hook device for holding objects during translation of the multi-purpose cooler over a surface.

4. The object of claim 3 wherein the object is a folding chair.

\* \* \* \* \*